US012345977B2

(12) United States Patent
Tseng et al.

(10) Patent No.: US 12,345,977 B2
(45) Date of Patent: Jul. 1, 2025

(54) DISPLAY DEVICE

(71) Applicants: InnoLux Corporation, Miao-Li County (TW); CARUX TECHNOLOGY PTE. LTD., Singapore (SG)

(72) Inventors: Yu-Chih Tseng, Miao-Li County (TW); Hong-Sheng Hsieh, Miao-Li County (TW); Chu-Hong Lai, Tainan (TW); Ying-Shiang Huang, Tainan (TW)

(73) Assignees: INNOLUX CORPORATION, Miao-Li County (TW); CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/668,758

(22) Filed: May 20, 2024

(65) Prior Publication Data
US 2024/0427184 A1    Dec. 26, 2024

(30) Foreign Application Priority Data

Jun. 20, 2023    (CN) .......................... 202310735766.3

(51) Int. Cl.
*G02F 1/1333*    (2006.01)
*G02F 1/13*    (2006.01)
*G02F 1/1339*    (2006.01)

(52) U.S. Cl.
CPC ........ *G02F 1/13338* (2013.01); *G02F 1/1323* (2013.01); *G02F 1/133345* (2013.01); *G02F 1/1339* (2013.01)

(58) Field of Classification Search
CPC .. G06F 3/0412; G02F 1/13338; G02F 1/1323; G02F 1/133305; G02F 1/13452
See application file for complete search history.

(56) References Cited

U.S. PATENT DOCUMENTS

| | | | |
|---|---|---|---|
| 10,802,356 B2 | 10/2020 | Harrold | |
| 2013/0154977 A1* | 6/2013 | Lee ................... | G02F 1/133528 445/24 |
| 2013/0314625 A1* | 11/2013 | Tsai .................... | G02F 1/13338 349/12 |
| 2018/0180924 A1* | 6/2018 | Chou ................ | G02F 1/133514 |

FOREIGN PATENT DOCUMENTS

CN    217718925 U    11/2022

* cited by examiner

*Primary Examiner* — Alexander P Gross
(74) *Attorney, Agent, or Firm* — McClure, Qualey & Rodack, LLP

(57) ABSTRACT

A display device is provided. The display device includes a display module for displaying pictures and a viewing angle control module adjacent to the display module. The viewing angle control module includes a first substrate, a second substrate opposite to the first substrate, a viewing angle control medium disposed between the first substrate and the second substrate, and a touch layer disposed between the viewing angle control medium and the first substrate. The touch layer includes a bridge electrode and first touch electrodes disposed on the first substrate, and an insulation layer disposed between the bridge electrode and the first touch electrodes. The insulation layer has openings, and the first touch electrodes are electrically connected to the bridging electrode through the openings.

17 Claims, 10 Drawing Sheets

DISPLAY DEVICE

CROSS REFERENCE TO RELATED APPLICATIONS

This Application claims priority of China Patent Application No. 202310735766.3, filed on Jun. 20, 2023, the entirety of which is incorporated by reference herein.

BACKGROUND OF THE INVENTION

Field of the Invention

The present invention relates to a display device, and, in particular, to a display device including a viewing angle control module.

Description of the Related Art

With the development of digital technology, display devices have become widely used in various aspects of daily life. Making display devices thinner has always been a goal of the industry. Colorless polyimide (CPI) films are currently used to produce thinner display devices. However, these CPI films can easily become damaged during TOD (Touch on Display) processes.

BRIEF SUMMARY OF THE INVENTION

An embodiment of the present invention provides a display device. The display device includes a display module for displaying pictures and a viewing angle control module adjacent to the display module. The viewing angle control module includes a first substrate, a second substrate opposite to the first substrate, a viewing angle control medium disposed between the first substrate and the second substrate, and a touch layer disposed between the viewing angle control medium and the first substrate. The touch layer includes a bridge electrode and first touch electrodes disposed on the first substrate, and an insulation layer disposed between the bridge electrode and the first touch electrodes. The insulation layer has openings, and the first touch electrodes are electrically connected to the bridging electrode through the openings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
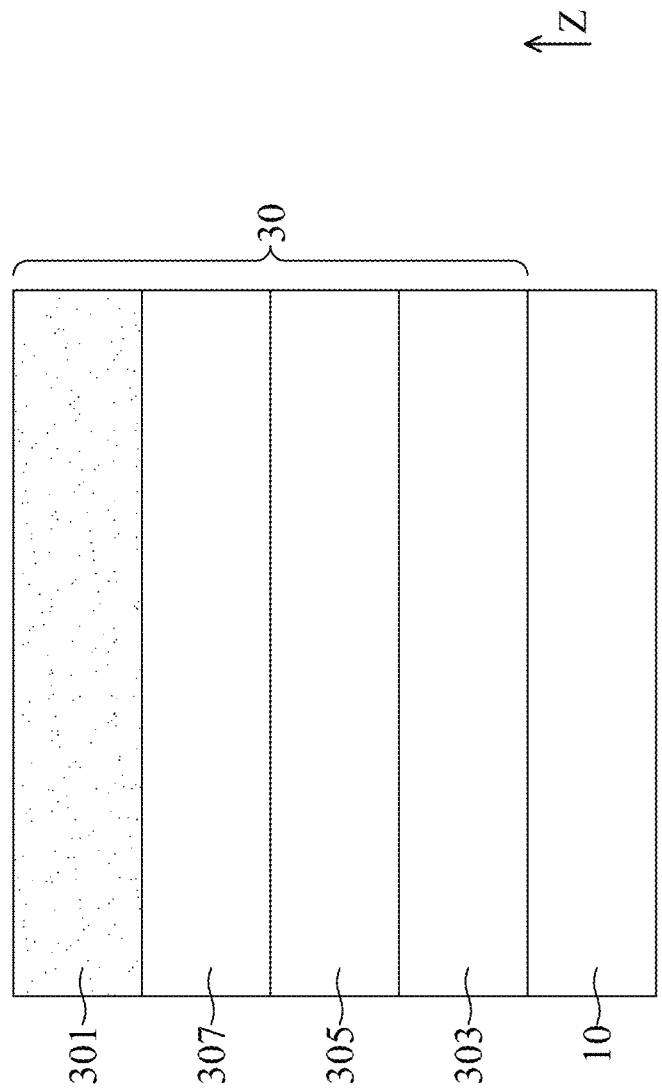
FIG. 1 is a schematic view of a display device according to an embodiment of the present disclosure.

The following description is made for the purpose of illustrating the general principles of the invention and should not be taken in a limiting sense. The scope of the invention is best determined by reference to the appended claims.

The following is a detailed description of the electronic device according to the embodiment of the present disclosure. The following disclosure provides many different embodiments, or examples, for implementing different features of the provided subject matter. Specific examples of components and arrangements are described below to simplify the present disclosure. These are, of course, merely examples and are not intended to be limiting. In addition, repeated symbols or labels may be used in different embodiments. These repetitions are made only for the purpose of briefly and clearly describing some embodiments of the present disclosure and do not imply any correlation between the different embodiments and/or structures discussed.

In the disclosure, the terms "approximate," "about," and "approximately" usually indicates a value of a given value or range that varies within 10%, or within 5%, or within 3%, or within 2%, or within 1%, or within 0.5%. In the disclosure, the term "a-b" indicates a value which is greater than or equal to a and less than or equal to b.

It should be understood that, although the terms "first", "second", "third" etc. are used herein to describe various elements, components, areas, layers, and/or parts, these elements, components, areas, layers, and/or parts should not be limited by these terms. These terms are only used to distinguish one elements, components, areas, layers, and/or parts from other elements, components, areas, layers, and/or parts. Thus, a first element, component, area, layer, or part discussed below could be termed as a second element, component, area, layer, or part without departing from the teachings of the present disclosure.

It should be understood that relative terms such as "under", "on", "horizontal", "vertical", "below", "above", "top", "bottom", etc. shall be construed to indicate orientations shown in the paragraph and the related accompanying drawings. The relative terms are used for explanatory purposes only and does not imply that the device described is needed to be manufactured or operated in a specific orientation. It should be understood that if the device in the drawings is turned upside down, elements described as being at the "lower" side will become elements described as being at the "upper" side. The embodiments of the present disclosure may be understood in conjunction with the drawings. The drawings of the embodiments of the present disclosure may also be regarded as a part of the description of the embodiments of the present disclosure. It should be understood that the drawings of the embodiments of the present disclosure are not drawn to scale. In fact, the dimensions of the elements may be arbitrarily increased or reduced for clarity of the features of the present disclosure.

Unless otherwise defined, all terms (including technical and scientific terms) used herein have the same meaning as commonly understood by a person skilled in the art to which the disclosure pertains. It will be further understood that terms, such as those defined in commonly used dictionaries, should be interpreted as having a meaning consistent with the relevant technology and the context or background of this disclosure and will not be interpreted in an idealized or overly formal sense unless expressly so defined herein.

Some terms are used to refer to specific elements throughout the specification and the following claims of this disclosure. It should be understood by those of skill in the art that the same elements may be referred to by different names by electronic equipment manufacturers. It is not intended herein to distinguish between elements that are functionally identical but have different names. In the specification and claims below, the terms "comprise" and "include" are open-ended terms and should be interpreted to mean "contains but not limited to . . . ".

The electronic device of the disclosure may include an encapsulated device, a semiconductor device, a display device, a backlight device, an antenna device, a sensing device, or a splicing device, but it is not limited thereto. The electronic device may be a bendable electronic device or a flexible electronic device. The display device may be a non-emissive-type display device or a self-emission type display device. The antenna device maybe a liquid-crystal type antenna device or a non-liquid-crystal type antenna device. The sensing device may be a sensing device that senses capacitance, light, heat energy or ultrasonic waves, but the present disclosure is not limited thereto. The splicing device may be, for example, a display splicing device or an antenna splicing device, but the present disclosure is not limited thereto. It should be noted that the electronic device may be any combination of the foregoing, but the present disclosure is not limited thereto.

In some embodiments of the present disclosure, a description such as "an element A surrounds an element B" means that in a schematic cross-sectional view or a schematic top view, at least a portion of the element B is disposed within the element A. That is, compared to the element A, the at least portion of the element B is closer to the center of the device. In some embodiments of the present disclosure, a description such as "an element A overlaps an element B" means that on a plane, at least a portion of a projection of the element B is within a projection of the element A or at least a portion of the projection of the element A is within the projection of the element B.

Figure 2:
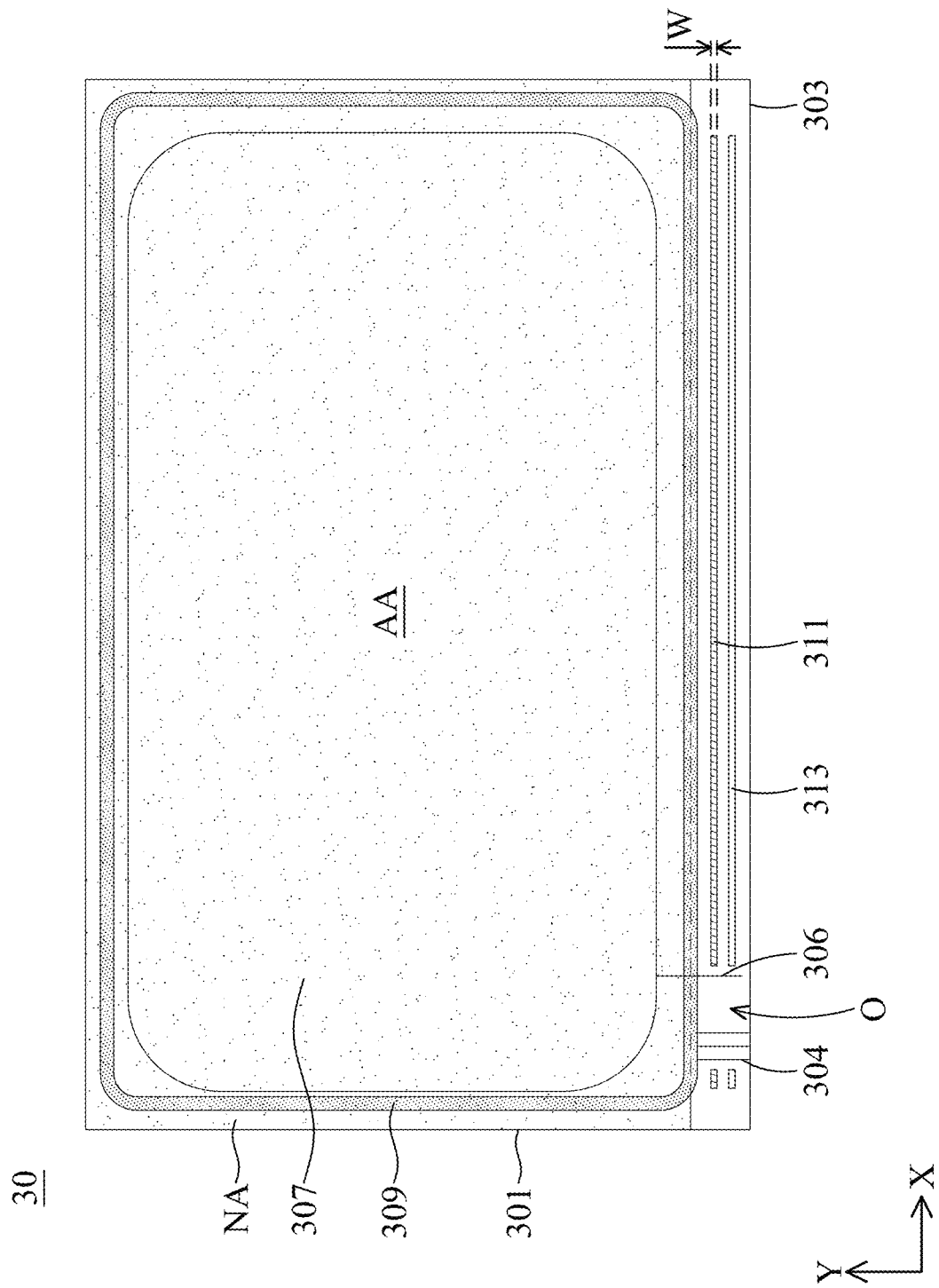
FIG. 2 is a schematic top view of a viewing angle control module according to an embodiment of the present disclosure.
Figure 3:
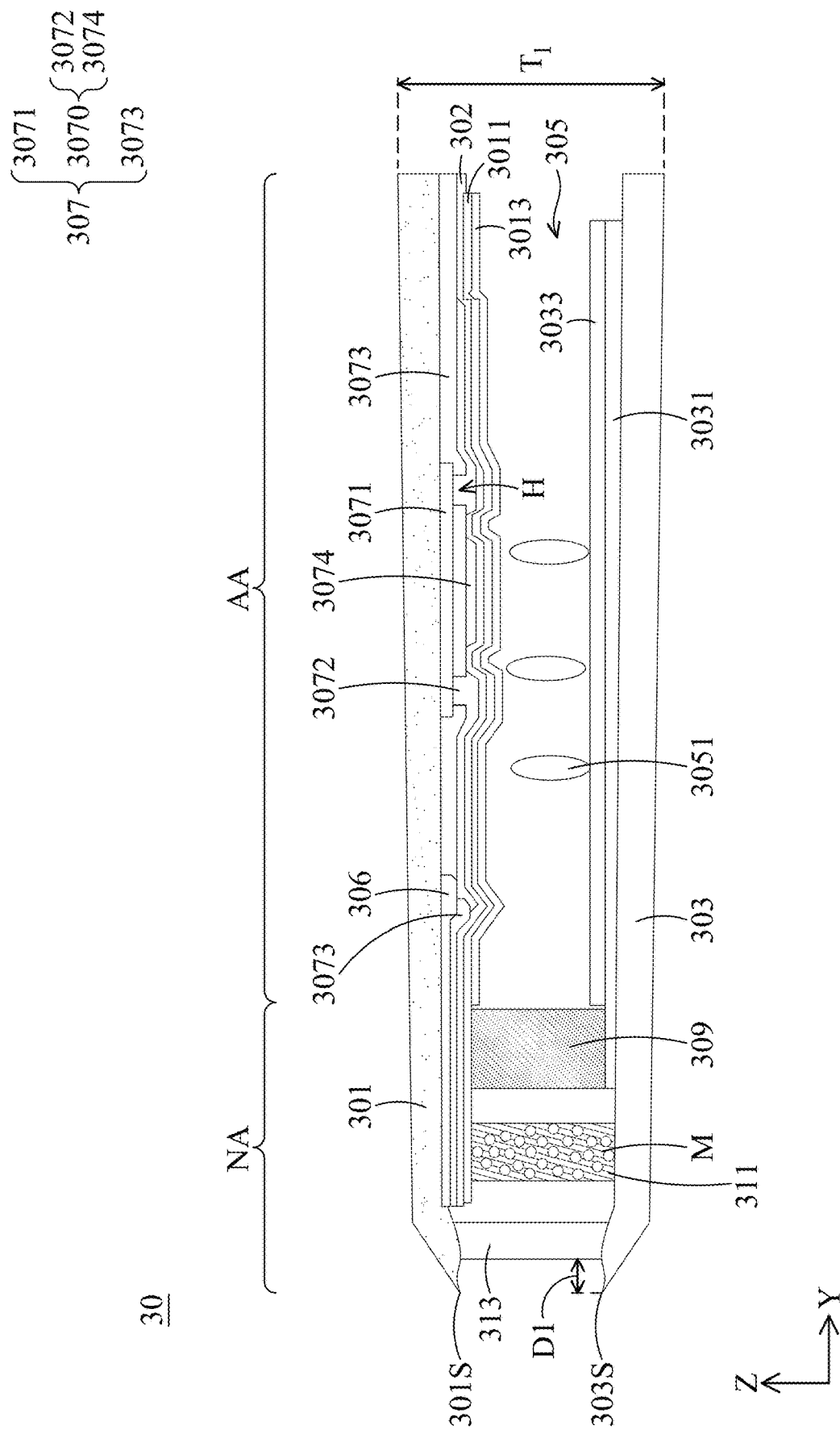
FIG. 3 is a schematic cross-sectional view of the viewing angle control module of FIG. 2.
Figure 4:
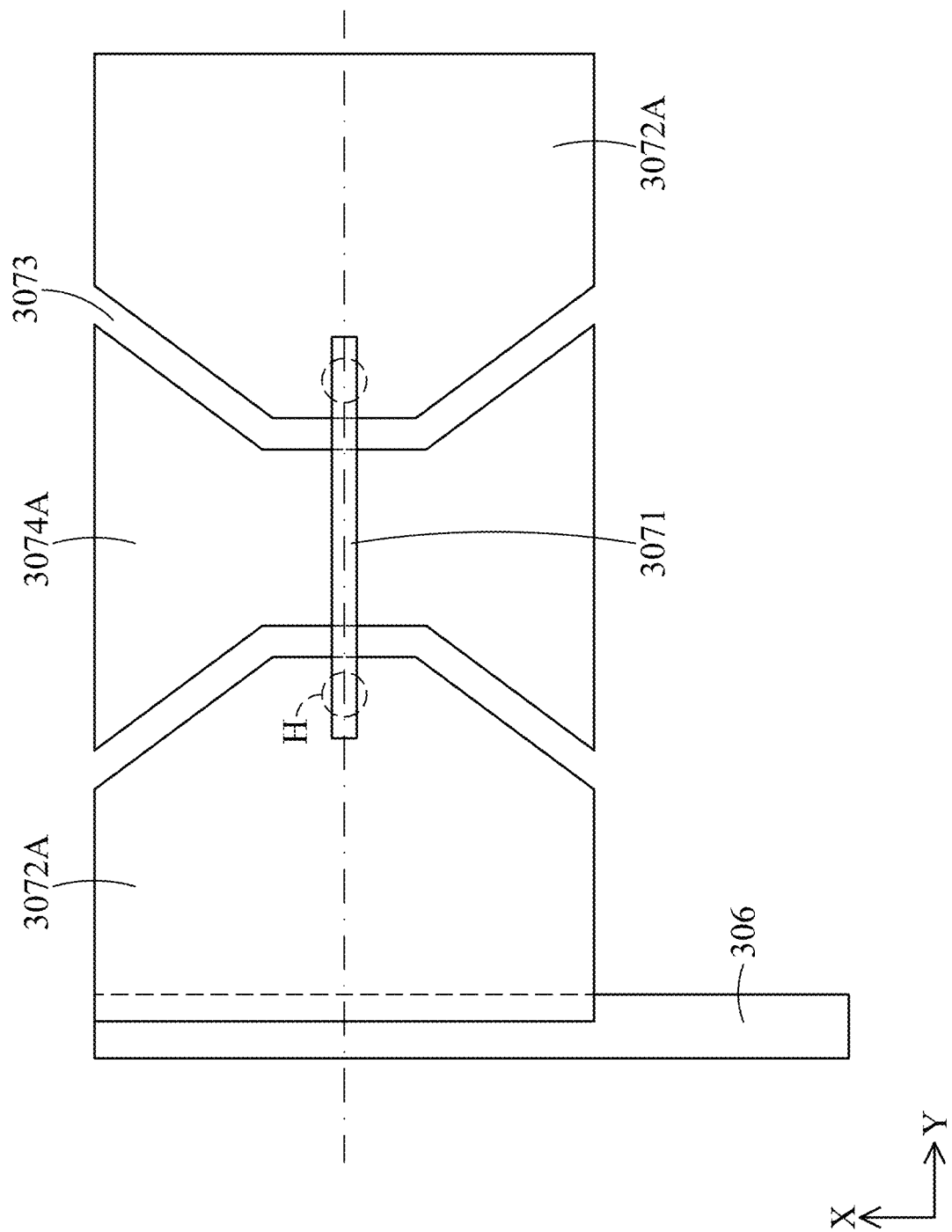
FIG. 4 is a schematic view illustrating a configuration of a touch electrode according to an embodiment of the present disclosure.
Figure 5:
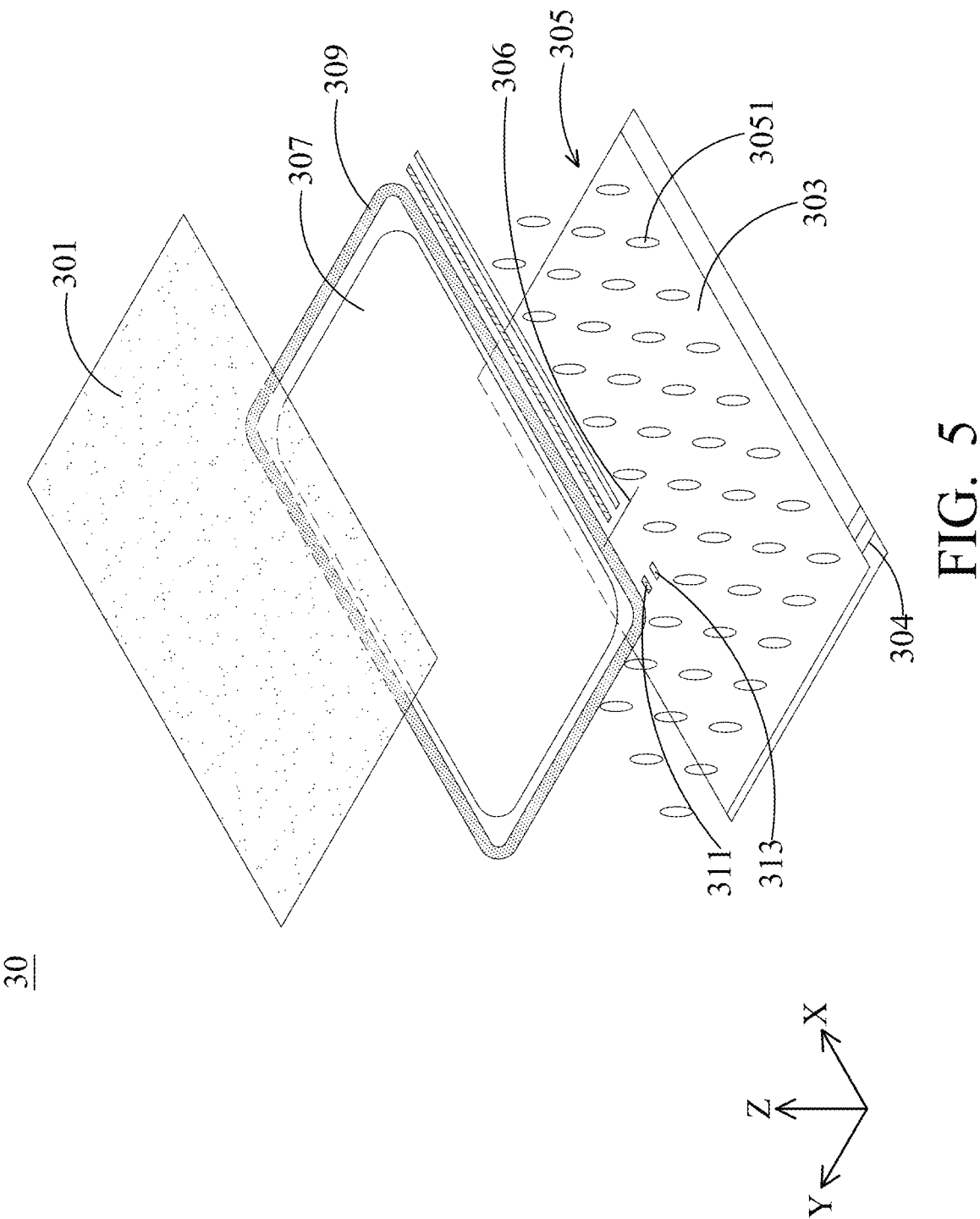
FIG. 5 is a schematic exploded view of a viewing angle control module according to an embodiment of the present disclosure.

The present disclosure provides a display device. FIG. 1 is a schematic view of a display device 1 according to an embodiment of the present disclosure. FIG. 2 is a schematic top view of a viewing angle control module 30 according to an embodiment of the present disclosure. FIG. 3 is a schematic cross-sectional view of the viewing angle control module 30 of FIG. 2. FIG. 4 is a schematic view illustrating a configuration of a touch electrode 3070 according to an embodiment of the present disclosure. FIG. 5 is a schematic exploded view of a viewing angle control module 30 according to an embodiment of the present disclosure.

As shown in FIG. 1, the display device 1 includes a display module 10 for displaying a picture and a viewing angle control module 30 disposed adjacent to the display module 10.

The display module 10 may include a self-emission type display module or a non-emissive-type display module. In some embodiments, the display module 10 may include a liquid crystal display module, an organic light-emitting diode (OLED) display module, a micro light-emitting diode (Micro LED) display module, a quantum dot light-emitting diode (QLED) display module, other suitable display modules, or any combination of the foregoing.

The viewing angle control module 30 may include a first substrate 301, a second substrate 303 disposed opposite to the first substrate 301, a viewing angle control medium 305 disposed between the first substrate 301 and the second substrate 303, and a touch layer 307 disposed between the viewing angle control medium 305 and the first substrate 301. In some embodiments, the viewing angle control module 30 may include an active area AA and a non-active area NA surrounding the active area AA. The touch layer 307 and the viewing angle control medium 305 are disposed in the active area AA of the viewing angle control module 30, as shown in FIGS. 2 and 3. In some embodiments, a thickness T1 of the viewing angle control module 30 may be greater than or equal to 5 μm and less than or equal to 30 μm, but the present disclosure is not limited thereto.

The first substrate 301 and/or the second substrate 303 may include a flexible substrate, a rigid substrate or a combination thereof, but the present disclosure is not limited thereto. In some embodiments, the first substrate 301 and/or the second substrate 303 may include a flexible substrate, as shown in FIG. 3, but the present disclosure is not limited thereto. The first substrate 301 and/or the second substrate 303 may include transparent materials, semi-transparent materials, or non-transparent materials. The first substrate 301 and/or the second substrate 303 may be a single-layer or multi-layer structure. In some embodiments, the first substrate 301 and/or the second substrate 303 may include wafer, glasses, quartz, sapphires, ceramics, polyimides (PI), polycarbonates (PC), polyethylene terephthalates (PET), polypropylenes (PP), other suitable materials, or any combination of the foregoing, but the present disclosure is not limited thereto.

The first substrate 301 may have a first edge 301S, and the second substrate 303 may have a second edge 303S corresponding to the first edge 301S of the first substrate 301. In the embodiment that the first substrate 301 and the second substrate 303 include flexible substrates, the first substrate 301 and/or the second substrate 303 may warp. In such an embodiment, in a normal direction (Z direction) of the display device 1 (a direction which is perpendicular to the display device 1), a distance between the first edge 301S of the first substrate 301 and the second edge 303S of the second substrate 303 may be smaller than a distance between the first substrate 301 and the second substrate 303 in the active area AA, as shown in FIG. 3. In the embodiment that the first substrate 301 and the second substrate 303 include rigid substrates, in a normal direction (Z direction) of the display device 1 (a direction which is perpendicular to the display device 1), a distance between the first edge 301S of the first substrate 301 and the second edge 303S of the second substrate 303 may be equal to a distance between the first substrate 301 and the second substrate 303 in the active area AA.

The first substrate 301 and the second substrate 303 may have the same or different structures, shapes, and areas. In some embodiments, on a plane (XY plane) perpendicular to the normal direction (Z direction) of the display device 1, an area of a projection of the first substrate 301 may be greater than an area of a projection of the touch layer 307, and an area of a projection of the second substrate 303 may be greater than the area of a projection of the first substrate 301, as shown in FIG. 2, but the disclosure is not limited thereto. In some embodiments, on a plane (XY plane) perpendicular to the normal direction (Z direction) of the display device 1, an area of a projection of the first substrate 301 may be greater than an area of a projection of the touch layer 307 and equal to an area of a projection of the second substrate 303.

In some embodiments, the viewing angle control medium 305 may include liquid crystal 3051, but the present disclosure is not limited thereto.

The touch layer 307 may include a bridge electrode 3071 and a touch electrode 3070 disposed on the first substrate 301, and an insulation layer 3073 disposed between the bridge electrode 3071 and the touch electrode 3070, as shown in FIG. 3. The bridge electrode 3071, the touch electrode 3070 and the insulation layer 3073 are all disposed between the viewing angle control medium 305 and the first substrate 301. In some embodiments, the bridge electrode 3071 is disposed adjacent to the first substrate 301, the touch electrode 3070 is disposed adjacent to the viewing angle control medium 305, and the insulation layer 3073 is disposed between the bridge electrode 3071 and the touch electrode 3070. That is, the bridge electrode 3071 is disposed between the touch electrode 3070 and the first substrate 301, as shown in FIG. 3, but the present disclosure is not limited thereto. In some embodiments, the bridge electrode 3071 is disposed adjacent to the viewing angle control medium 305, the touch electrode 3070 is disposed adjacent to the first substrate 301, and the insulation layer 3073 is disposed between the bridge electrode 3071 and the touch electrode 3070. That is, the touch electrode 3070 is disposed between the bridge electrode 3071 and the first substrate 301.

In some embodiments, the touch electrode 3070 may include a first touch electrode 3072 and a second touch electrode 3074 that are not electrically connected to each other. As shown in FIG. 4, the first touch electrode 3072 may include a plurality of first touch units 3072A and the second touch electrode 3074 may include a plurality of second touch units 3074A. The first touch units 3072A are arranged along a first direction (e.g., Y direction), and the second touch units 3074A extend along a second direction (e.g., X direction) that is different from the first direction. The insulation layer 3073 may have a plurality of openings H. The bridge electrode 3071 may electrically connect to the first touch electrode 3072 of the touch electrode 3070 through the opening H of the insulation layer 3073. In particular, the bridge electrode 3071 may electrically connect the first touch units 3072A of the first touch electrode 3072 through the opening H. The first touch units 3072A may electrically connect to each other through the bridge electrode 3071. The second touch units 3074A may be electrically connect to each other and not electrically connect to the bridge electrode 3071.

In some embodiments, as shown in FIG. 3 and FIG. 5, the viewing angle control module 30 may include a sealant 309 disposed between the first substrate 301 and the second substrate 303 and surrounding the touch layer 307. The sealant 309 may surround the first touch electrode 3072 and the second touch electrode 3074. The sealant 309 may be disposed in the non-active area NA. In some embodiments, the viewing angle control module 30 may further include an auxiliary sealant 313 disposed between the first substrate 301 and the second substrate 303. The auxiliary sealant 313 may be disposed between the sealant 309 and the first edge 301S of the first substrate 301 and the second edge 303S of the second substrate 303. In some embodiments, the minimum distance D1 between the auxiliary sealant 313 and the first edge 301S of the first substrate 301 and the second edge 303S of the second substrate 303 may be about 0.5-300 micrometer (μm). That is, the minimum distance D1 between the auxiliary sealant 313 and the first edge 301S of the first substrate 301 and the second edge 303S of the second substrate 303 may be greater than or equal to 0.5 microns and less than or equal to 300 microns. In some embodiments, the auxiliary sealant 313 may be disposed at one side or two opposite sides of the sealant 309, as shown in FIGS. 2 and 5, but the disclosure is not limited thereto. In some embodiments, the auxiliary sealant 313 may have a "☐" shape surrounding each side of the sealant 309.

In some embodiments, the viewing angle control module 30 may further include a conductive adhesive 311 disposed between the first substrate 301 and the second substrate 303 and between the sealant 309 and the auxiliary sealant 313, as shown in FIGS. 2-5. In some embodiments, the conductive adhesive 311 may be disposed on one side of the sealant 309, but the disclosure is not limited thereto. In some embodiments, the conductive adhesive 311 may have a "☐" shape surrounding each side of the sealant 309. In some embodiments, the conductive adhesive 311 may include a plurality of conductive particles M, as shown in FIG. 3. The conductive adhesive 311 has a conductive adhesive width and at least one opening. For example, as shown in FIG. 2, the conductive adhesive 311 extends along the X direction and has an opening O in the X direction. The conductive adhesive 311 has a conductive adhesive width W in the Y direction perpendicular to the X direction.

In some embodiments, a first conductive layer 3011, a first insulation layer 3013, and an intermediate insulation layer 302 may be provided on the first substrate 301. The first conductive layer 3011 may be disposed between the touch layer 307 and the first insulation layer 3013 and the intermediate insulation layer 302 may be disposed between the touch layer 307 and the first conductive layer 3011, as shown in FIG. 3. The first conductive layer 3011 may have a single-layer or multi-layer structure. In some embodiments, the first conductive layer 3011 may include a transparent conductive layer. The transparent conductive layer may include an indium tin oxide (ITO) film, an indium zinc oxide (IZO) film, an aluminum zinc oxide (AZO) film, a zinc zirconium oxide (ZZO) film, other similar films, or any combination of the foregoing, but the present disclosure is not limited thereto. In some embodiments, the first insulation layer 3013 may include a polyimide (PI) film, other similar compounds, or any combination of the foregoing, but the present disclosure is not limited thereto. In some embodiments, the intermediate insulation layer 302 may include an oxide film, a nitride film, an oxynitride film, an OG film, an IMF film, other similar compounds, or any combination of the foregoing. In some embodiments, the intermediate insulation layer 302 may include a silicon oxynitride film, but the present disclosure is not limited thereto.

In some embodiments, a second conductive layer 3031 and a second insulation layer 3033 may be provided on the second substrate 303. The second conductive layer 3031 and the second insulation layer 3033 may be similar to the first conductive layer 3011 and the first insulation layer 3013, so the compositions and structures thereof will not be described here again. The second conductive layer 3031 may be disposed between the second insulation layer 3033 and the second substrate 303, as shown in FIG. 3.

In some embodiments, the conductive adhesive 311 may electrically connect the first conductive layer 3011, the second conductive layer 3031, and/or the touch layer 307 to an integrated circuit (IC) or a flexible circuit board (FPC), or an external device.

In some embodiments, a metal line 304 may be provided on the first substrate 301 and/or the second substrate 303 for electrically connecting the first substrate 301 and/or the second substrate 303 to an integrated circuit (IC), a flexible circuit board (FPC), or an external device, or grounding the first substrate 301 and/or the second substrate 303. The first conductive layer 3011 and the second conductive layer 3031 may be electrically connected to the integrated circuit (IC), the flexible circuit board (FPC), or the external device through the metal line 304 to transmit or receive substrate control signals or may be grounded through the metal line 304. The metal line 304 may be disposed in the opening O of the conductive adhesive 311. In some embodiments, the minimum distance between the conductive adhesive 311 and the metal line 304 may be greater than 2 times the conductive adhesive width W (2W). The risk of short circuit between the conductive adhesive 311 and the metal line 304 may be avoided or reduced by the configuration mentioned above.

In some embodiments, the metal line 304 may be disposed on the second substrate 303. The first conductive layer 3011 may electrically connect to the metal line 304 disposed on the second substrate 303 through vias, conductive adhesives, any suitable conductive components, or a combination thereof. The first conductive layer 3011 and the second conductive layer 3031 may be electrically connected to an integrated circuit (IC), a flexible circuit board (FPC), or an external device or may be grounded through the metal line 304 disposed on the second substrate 303, but the present disclosure is not limited thereto. In some embodiments, the metal line 304 may be disposed on the first substrate 301 and the second substrate 303. The first conductive layer 3011 and the second conductive layer 3031 may be electrically connected to the integrated circuit (IC), the flexible circuit board (FPC), or the external device or may be grounded through the metal line 304 on the first substrate 301 and the second substrate 303 respectively.

In some embodiments, a signal line 306 may be provided between the first substrate 301 and the second substrate 303 for electrically connecting the touch layer 307 to an integrated circuit (IC) or a flexible circuit board (FPC), or electrically connecting the first substrate 301 and the second substrate 303 to external devices or peripheral circuits (not shown). The signal line 306 may be disposed in the opening O of the conductive adhesive 311. In some embodiments, the minimum distance between the conductive adhesive 311 and the signal line 306 may be greater than 2 times the conductive adhesive width W. The risk of short circuit between the conductive adhesive 311 and the signal line 306 may be reduced by the configuration mentioned above. In some embodiments, the signal line 306 may be disposed on the first substrate 301. A portion of the signal line 306 in the active area AA overlaps the first touch electrode 3072 in the normal direction (Z direction) of the display device and is electrically connected to the first touch electrode 3072. In some embodiments, the portion of the signal line 306 in the active area AA may be between the first substrate 301 and the first touch electrode 3072, as shown in FIG. 3, but the disclosure is not limited thereto. In some embodiments, the first touch electrode 3072 may be between the portion of the signal line 306 in the active area AA and the first substrate 301. In some embodiments, the portion of the signal line 306 in the non-active area NA may overlap with the conductive adhesive 311 in the Z direction. In some embodiments, the conductive adhesive 311 in the non-active area NA may be between the portion of the signal line 306 and the second substrate 303, as shown in FIG. 3. The signal line 306 may electrically connect the first touch electrode 3072 to an integrated circuit (IC), a flexible circuit board (FPC), or an external device to transmit signals to the first touch electrode 3072 or receive signals from the first touch electrode 3072. In some embodiments, the signal line 306 may electrically connect to an integrated circuit (IC) disposed on the second substrate 303, a flexible circuit board (FPC), or an external device through the conductive adhesive 311, vias, any suitable conductive components, or a combination thereof.

In some embodiments, the signal line 306 may be electrically connected to the second touch electrode 3074. The signal line 306 may electrically connect the second touch electrode 3074 to an integrated circuit (IC), a flexible circuit board (FPC), or an external device to transmit signals to the second touch electrode 3074 or receive signals from the second touch electrode 3074.

The sealant 309, the auxiliary sealant 313, the conductive adhesive 311 and the metal line 304 may be disposed in the non-active area NA of the viewing angle control module 30. The signal line 306 is disposed in the active area AA of the viewing angle control module 30 and extends to the non-active area NA of the viewing angle control module 30 from the active area AA of the viewing angle control module 30.

Figure 6:
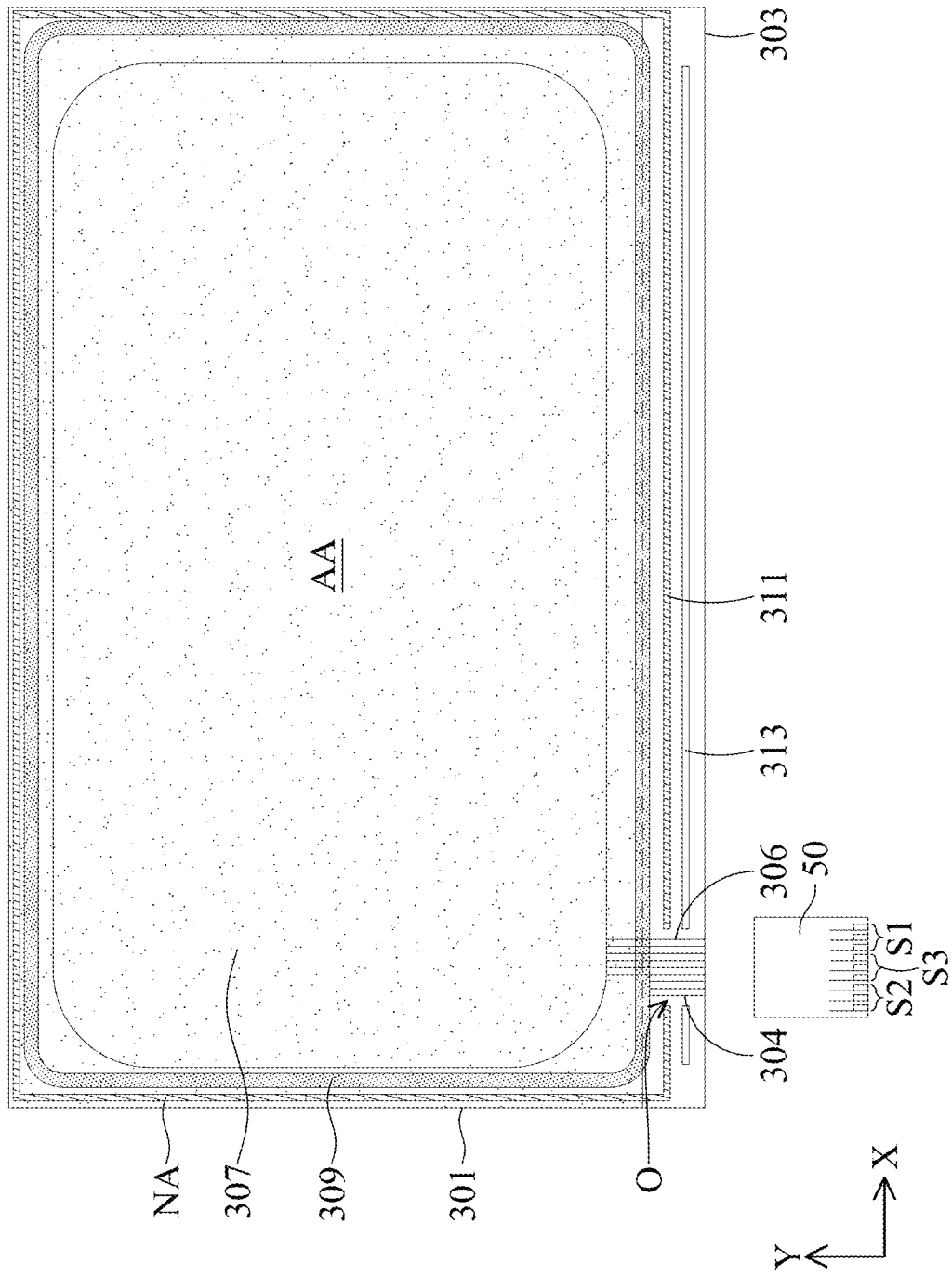
FIG. 6 is a schematic view illustrating a configuration of a viewing angle control module and a flexible circuit board according to an embodiment of the present disclosure.
Figure 7:
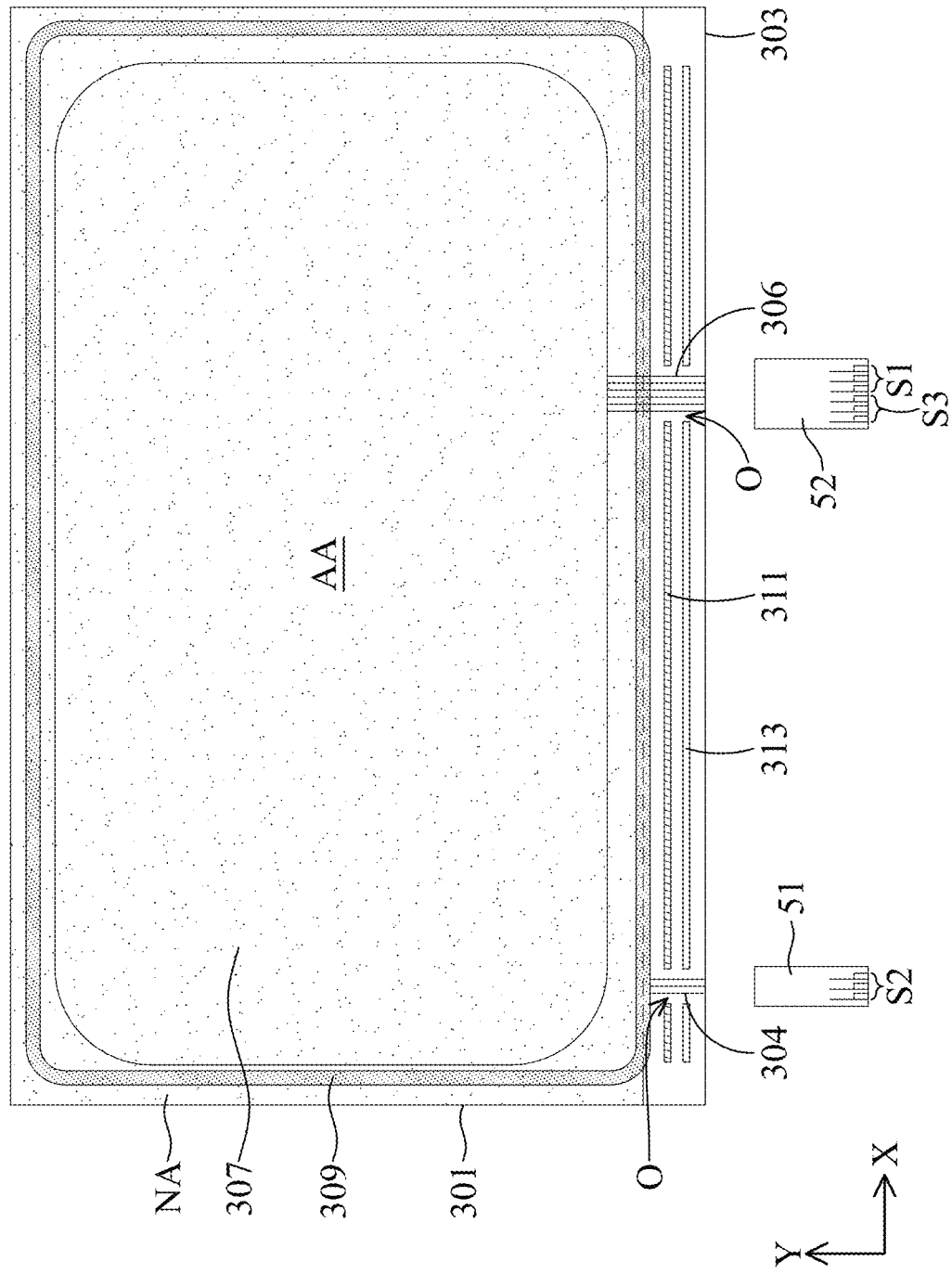
FIG. 7 is a schematic view illustrating a configuration of a viewing angle control module and flexible circuit boards according to another embodiment of the present disclosure.
Figure 8:
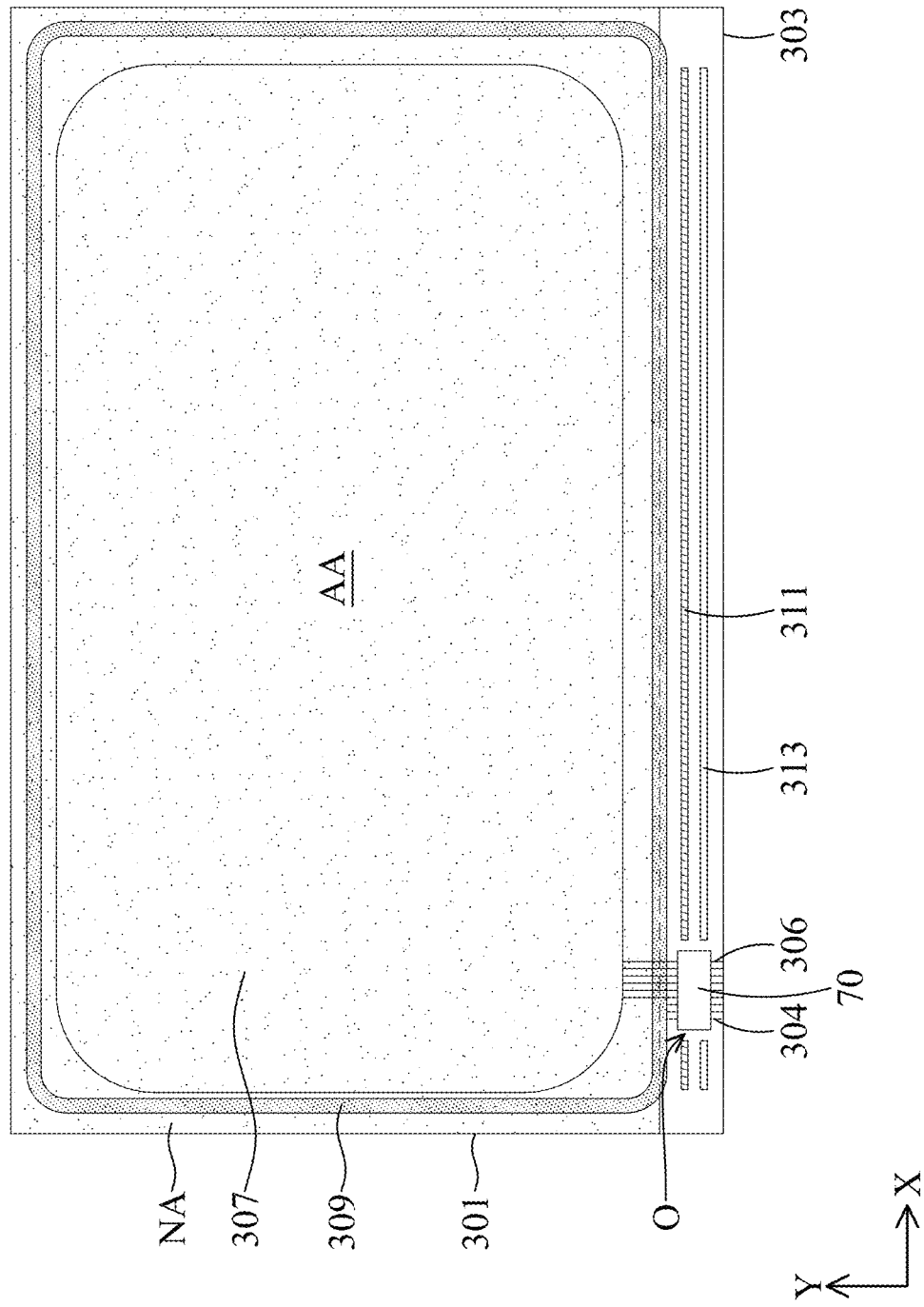
FIG. 8 is a schematic view illustrating a configuration of a viewing angle control module and an integrated circuit according to an embodiment of the present disclosure.
Figure 9:
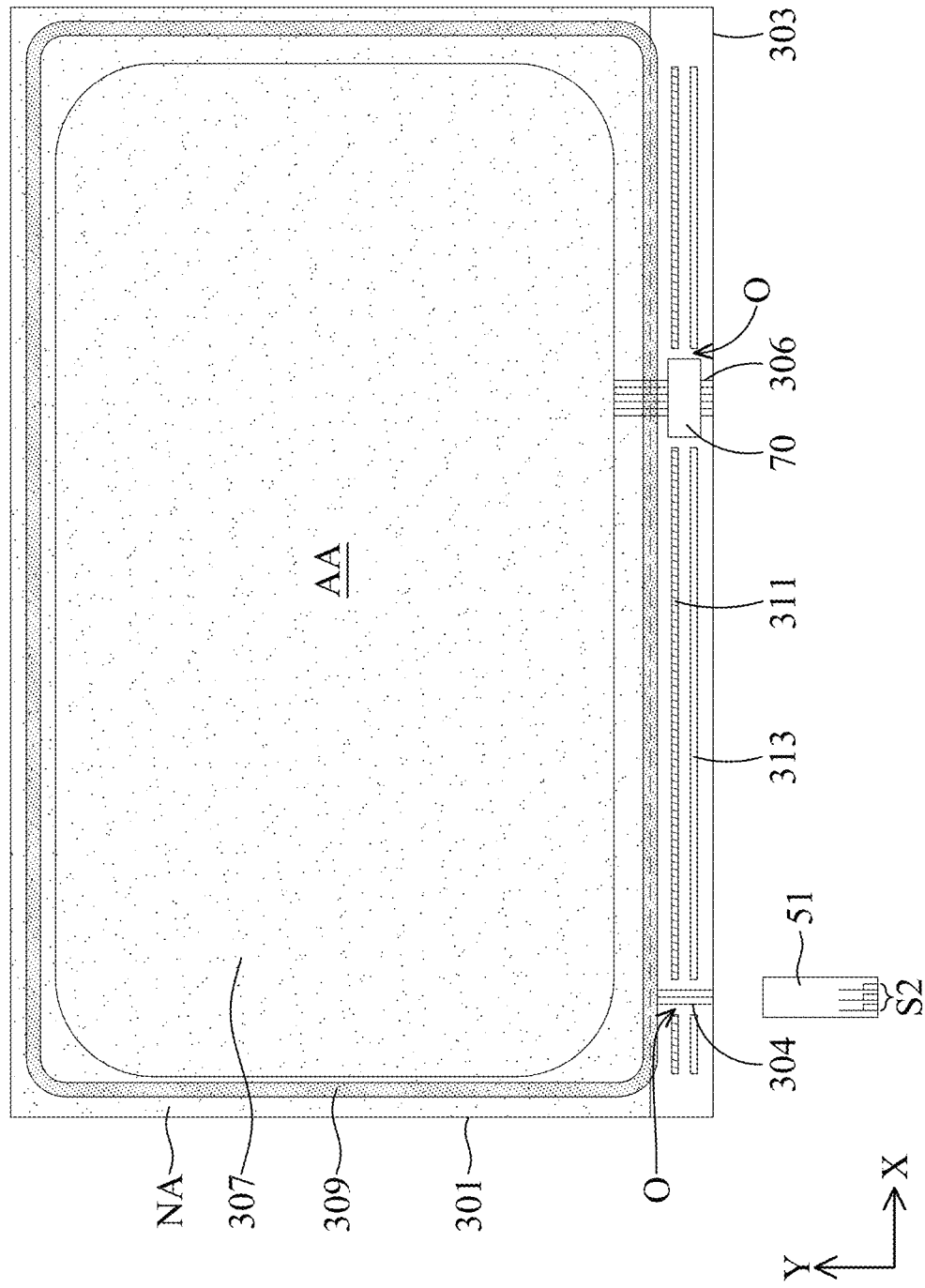
FIG. 9 is a schematic view illustrating a configuration of a viewing angle control module, an integrated circuit and a flexible circuit board according to an embodiment of the present disclosure.

FIG. 6 is a schematic view illustrating a configuration of the viewing angle control module 30 and a flexible circuit board 50 according to an embodiment of the present disclosure. FIG. 7 is a schematic view illustrating a configuration of the viewing angle control module 30 and flexible circuit boards 51 and 52 according to another embodiment of the present disclosure. FIG. 8 is a schematic view illustrating a configuration of the viewing angle control module 30 and an integrated circuit 70 according to an embodiment of the present disclosure. FIG. 9 is a schematic view illustrating a configuration of the viewing angle control module 30, the integrated circuit 70 and the flexible circuit board 51 according to an embodiment of the present disclosure. The configuration relationship between the viewing angle control module 30 and the integrated circuit and/or flexible circuit board will be further described below with reference to FIGS. 6 to 9.

FIG. 6 is a schematic view illustrating a configuration of the viewing angle control module 30 and the flexible circuit board 50 according to an embodiment of the present disclosure. As shown in FIG. 6, the conductive adhesive 311 has a "□" shape surrounding each side of the sealant 309. In FIG. 6, first touch signal pads S1, second touch signal pads S3, and control signal pads S2 are provided on the flexible circuit board 50. In some embodiments, the second touch signal pads S3 are disposed between the first touch signal pads S1 and the control signal pads S2. The metal lines 304 may electrically connect to the control signal pads S2. The first conductive layer 3011 and/or the second conductive layer 3031 are electrically connected to the control signal pads S2 through the metal lines 304. In some embodiments, the control signal pads S2 may be electrically connected to an external device to receive, for example, switching signals to the first substrate 301 and the second substrate 303, but the disclosure is not limited thereto. In some embodiments, some of the control signal pads S2 may be electrically connected to an external device and some of the control signal pads S2 may be grounded. The signal lines 306 may be electrically connected to the first touch signal pads S1 and the second touch signal pads S3. The first touch electrode 3072 may be electrically connected to the first touch signal pads S1 through the signal lines 306, and the second touch electrode 3074 may be electrically connected to the second touch signal pads S3 through the signal lines 306. The first touch electrode 3072 and the second touch electrode 3074 may be electrically connected to an external device to receive or transmit, for example, touch signals to the touch layer 307, but the disclosure is not limited thereto.

FIG. 7 is a schematic view illustrating a configuration of the viewing angle control module 30 and flexible circuit boards 51 and 52 according to another embodiment of the present disclosure. Except that the control signal pads S2 are disposed on the flexible circuit board 51, and the first touch signal pads S1 and the second touch signal pads S3 are disposed on the flexible circuit board 52 spaced a distance from the flexible circuit board 51, the control signal pads S2, the first touch signal pads S1 and the second touch signal pads S3 are connected to the first conductive layer 3011 and/or the second conductive layer 3031, and the first touch electrode 3072 in the same manner as referred to FIG. 6, so the details will not be described again.

FIG. 8 is a schematic view illustrating a configuration of the viewing angle control module 30 and the integrated circuit 70 according to an embodiment of the present disclosure. In FIG. 8, the integrated circuit 70 is disposed on the first substrate 301 or the second substrate 303. The integrated circuit 70 is electrically connected to an external device. The metal lines 304 are electrically connected to the integrated circuit 70 to receive, for example, switching signals to the first substrate 301 and the second substrate 303, but the disclosure is not limited thereto. The signal lines 306 are electrically connected to the integrated circuit 70 to receive or transmit, for example, touch signals to the touch layer 307, but the present disclosure is not limited thereto.

FIG. 9 is a schematic view illustrating a configuration of the viewing angle control module 30, the integrated circuit 70 and the flexible circuit board 51 according to an embodiment of the present disclosure. In FIG. 9, the integrated circuit 70 is disposed on the first substrate 301 or the second substrate 303. The integrated circuit 70 is electrically connected to an external device. The signal lines 306 are electrically connected to the integrated circuit 70 to receive or transmit, for example, touch signals to the touch layer 307, but the present disclosure is not limited thereto. The control signal pads S2 are provided on the flexible circuit board 51. The metal lines 304 may be electrically connected to the control signal pads S2. The first conductive layer 3011 and/or the second conductive layer 3031 are electrically connected to the control signal pads S2 through the metal lines 304. In some embodiments, the control signal pads S2 may be electrically connected to an external device to receive, for example, switching signals to the first substrate 301 and the second substrate 303, but the disclosure is not limited thereto. In some embodiments, some of the control signal pads S2 may be electrically connected to the external device and some of the control signal pads S2 may be grounded. The configuration relationship between the viewing angle control module 30 and the integrated circuit and/or the flexible circuit board in the present disclosure is not limited to the aspect described above with reference to FIGS. 6 to 9. In some embodiments, the first touch signal pads S1, the control signal pads S2, and the second touch signal pads S3 may be disposed on three flexible circuit boards, and the three flexible circuit boards are spaced at a distance from each other. In some embodiments, the metal lines 304 may be electrically connected to the integrated circuit 70, and the signal lines 306 may be electrically connected to the flexible circuit board on which the first touch signal pads S1 and the second touch signal pads S3 are disposed. In some embodiments, the signal lines 306 and metal lines 304 in the viewing angle control module 30 may be directly electrically connected to the external device or grounded.

Figure 10:
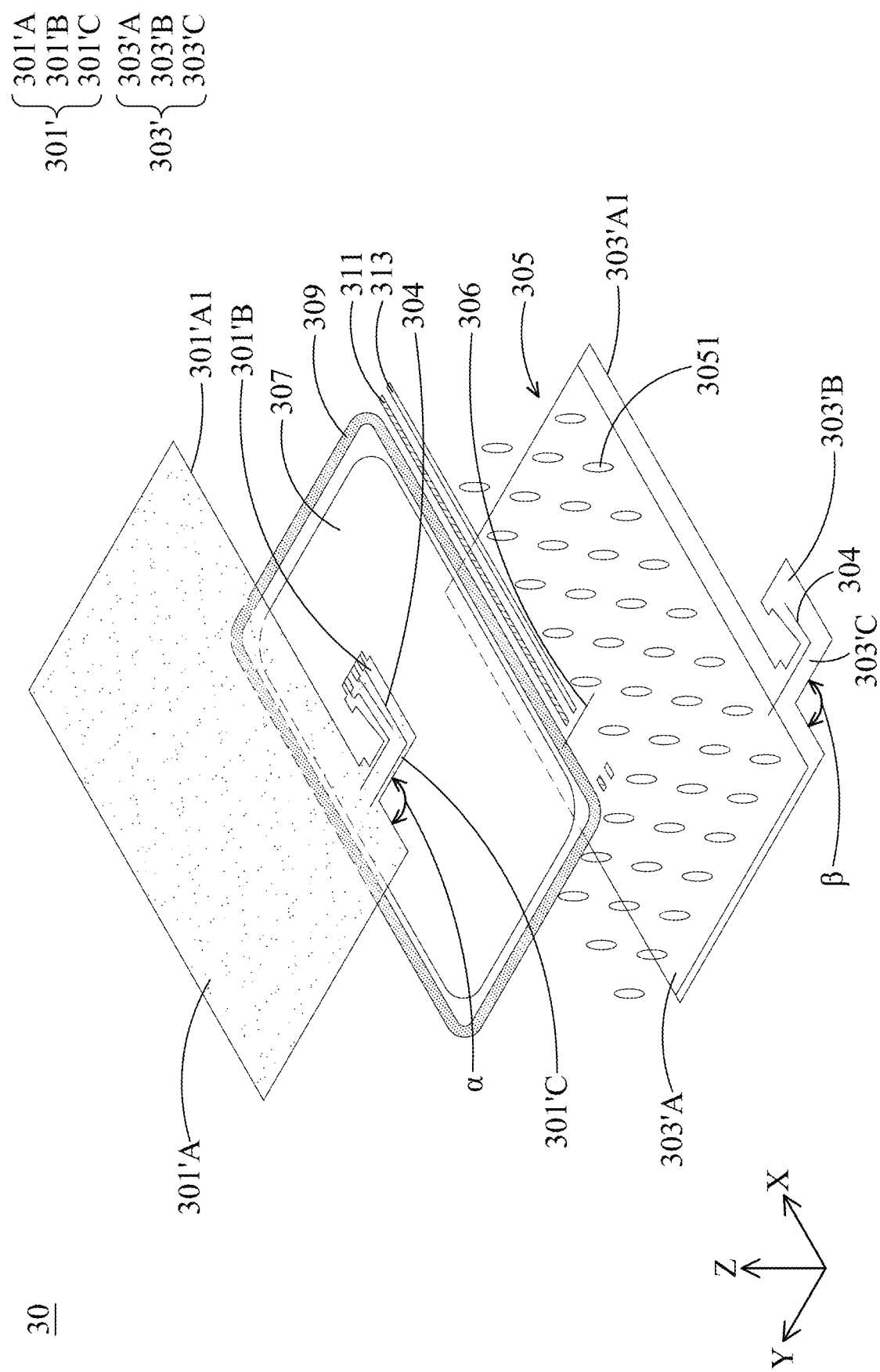
FIG. 10 is a schematic exploded view of a viewing angle control module according to another embodiment of the present disclosure.

FIG. 10 is schematic exploded view of the viewing angle control module 30 according to another embodiment of the present disclosure. A configuration in which the signal lines 306 and the metal lines 304 in the viewing angle control module 30 may be directly electrically connected to an external device or grounded is described below with reference to FIG. 10. Except that shapes of the projections of the first substrate 301' and the second substrate 303' on the plane (XY plane) perpendicular to the normal direction (Z direction) of the display device 1 of FIG. 10 are different from that of the first substrate 301 and the second substrate 303 of FIG. 1, the structure of the viewing angle control module 30 shown in FIG. 10 is substantially similar to that of the viewing angle control module 30 shown in FIG. 1. The following mainly describes the differences between the viewing angle control module 30 shown in FIG. 10 and the viewing angle control module 30 shown in FIG. 1.

As shown in FIG. 10, the first substrate 301' may include a first main portion 301'A, a first extension portion 301'B and a first connection portion 301'C. The first main portion 301'A has a side 301'A1 adjacent to the first extension portion 301'B and the first connection portion 301'C. In some embodiments, the extending direction of the side 301'A1 is the same as the extending direction of the conductive adhesive 311 (X direction). The first connection portion 301'C extends from the first main portion 301'A to the first extension portion 301'B and connects the first main portion 301'A and the first extension portion 301'B. The first extension portion 301'B extends along a direction that is substantially perpendicular to the extending direction of the first connection portion 301'C. There may be an angle α between the extension direction of the first connection portion 301'C and the side 301'A1 of the first main portion 301'A. The angle α may be in the range of 90-180°.

The second substrate 303' may include a second main portion 303'A, a second extension portion 303'B, and a second connection portion 303'C. In some embodiments, on a plane (XY plane) perpendicular to the normal direction (Z direction) of the display device 1, the projection of the first substrate 301' may have an area and shape substantially the same as that of the second substrate 303', but the disclosure is not limited thereto. In some embodiments, the second main portion 303'A has a side 303'A1 corresponding to the side 301'A1 of the first main portion 301'A. The second connection portion 303'C extends from the second main portion 303'A to the second extension portion 303'B and connects the second main portion 303'A and the second extension portion 303'B. The second extension portion 303'B extends along a direction that is substantially perpendicular to the extending direction of the second connection portion 303'C. There may be an angle β between the extending direction of the second connection portion 303'C and the side 303'A1 of the second main portion 303'A. The angle β may be in the range of 90-180°.

In some embodiments, the metal line 304 connecting the first conductive layer 3011 and the second conductive layer 3031 and the signal line 306 connecting the first touch electrode 3072 and the second touch electrode 3074 may extend to the first extension portion 301'B of the first substrate 301' and/or the second extension portion 303'B of the second substrate 303'. The first conductive layer 3011, the second conductive layer 3031, the first touch electrode 3072, and the second touch electrode 3074 may be directly electrically connected to the external device without being indirectly electrically connected to an external device by the first extension portion 301'B of the first substrate 301' and the second extension portion 303'B of the second substrate 303' without an integrated circuit (IC) and/or a flexible circuit board (FPC).

The present disclosure may provide a thin display device having good display quality. The display device according to some embodiments of the present disclosure includes a viewing angle control module having a thickness greater than or equal to 5 μm and less than or equal to 30 μm. In addition, according to some embodiments, the viewing angle control module of the present disclosure may include a first substrate and a second substrate including extension portions. The viewing angle control module of the present disclosure may be directly electrically connected to an external device by the extension portions of the first substrate and the second substrate without using an integrated circuit (IC) and/or a flexible circuit board (FPC).

While the disclosure has been described by way of example and in terms of the preferred embodiments, it should be understood that the disclosure that changes, substitutions and modifications may be made without departing from the spirit and scope of the disclosure. In addition, the protection scope of the present disclosure is not limited to the processes, machines, fabrications, compositions, devices, methods and steps in the specific embodiments described in the specification. According to the embodiments of the present disclosure, a person of ordinary skill in the art may understand that current or future processes, machines, fabrications, compositions, devices, methods and steps capable of performing substantially the same functions or achieving substantially the same results may be used in the embodiments of the present disclosure. Therefore, the protection scope of the present disclosure includes the above-mentioned processes, machines, fabrications, compositions, devices, methods and steps. In addition, features of different embodiments may be used together arbitrary as long as they do not violate the spirit of the disclosure or conflict with each other. Each claim constitutes an individual embodiment, and the protection scope of the present disclosure includes the combination of the claims and embodiments.

What is claimed is:

1. A display device, comprising:
   a display module for displaying pictures; and
   a viewing angle control module adjacent to the display module, wherein the viewing angle control module comprises:
   a first substrate;
   a second substrate opposite to the first substrate;
   a sealant, a conductive adhesive, and an auxiliary sealant disposed between the first substrate and the second substrate, wherein the conductive adhesive is between the sealant and the auxiliary sealant;
   a viewing angle control medium disposed between the first substrate and the second substrate; and
   a touch layer disposed between the viewing angle control medium and the first substrate, wherein the touch layer comprises:
   a bridge electrode disposed on the first substrate;
   first touch electrodes disposed on the first substrate; and
   an insulation layer disposed between the bridge electrode and the first touch electrodes and having openings,
   wherein the first touch electrodes are electrically connected to the bridging electrode through the openings and the conductive adhesive has a "▢" shape surrounding each side of the sealant.

2. The display device as claimed in claim 1, wherein the first touch electrodes comprise a plurality of first touch units, the plurality of first touch units are arranged along a first direction, and the bridge electrode is electrically connected to the first touch units through the openings.

3. The display device as claimed in claim 1, wherein the touch layer further comprises second touch electrodes disposed on the insulation layer, wherein the first touch electrodes and the second touch electrodes are not electrically connected to each other.

4. The display device as claimed in claim 3, wherein the second touch electrodes comprise a plurality of second touch units, and the plurality of first touch units are arranged along a second direction that is different from the first direction.

5. The display device as claimed in claim 1, wherein the sealant surrounds the first touch electrodes and the second touch electrodes.

6. The display device as claimed in claim 1, wherein the viewing angle control module further comprises a signal line disposed on the first substrate, and the signal line overlaps the first touch electrodes and is electrically connected to the first touch electrodes.

7. The display device as claimed in claim 6, wherein in a cross-sectional view, the conductive adhesive is between the signal line and the second substrate.

8. The display device as claimed in claim 1, wherein the first substrate is a flexible substrate.

9. The display device as claimed in claim 1, wherein the second substrate is a flexible substrate.

10. The display device as claimed in claim 1, wherein the viewing angle control module has a thickness greater than or equal to 5 μm and less than or equal to 30 μm.

11. The display device as claimed in claim 1, wherein the conductive adhesive comprises a plurality of conductive particles.

12. The display device as claimed in claim 11, wherein the viewing angle control module further comprises:
   a first conductive layer on the first substrate; and
   a second conductive layer on the second substrate,
   wherein the first conductive layer and the second conductive layer electrically connect to an integrated circuit (IC), a flexible circuit board (FPC), or an external device or are grounded through the metal line.

13. The display device as claimed in claim 1, wherein the viewing angle control module further comprises a metal line disposed between the first substrate and the second substrate, wherein the conductive adhesive has an opening and the metal line is disposed in the opening.

14. The display device as claimed in claim 13, wherein the conductive adhesive has a conductive adhesive width, and a minimum distance between the conductive adhesive and the metal line is greater than 2 times the conductive adhesive width.

15. The display device as claimed in claim 1, wherein the first substrate comprises a first main portion, a first extension portion adjacent to the first main portion and a first connection portion extending from the first main portion to the first extension portion and connecting the first main portion and the first extension portion.

16. The display device as claimed in claim 1, wherein the second substrate comprises a second main portion, a second extension portion adjacent to the second main portion and a second connection portion extending from the second main portion to the second extension portion and connecting the second main portion and the second extension portion.

17. A display device, comprising:
a display module for displaying pictures; and
a viewing angle control module adjacent to the display module, wherein the viewing angle control module comprises:
a first substrate;
a second substrate opposite to the first substrate;
a metal line and a conductive adhesive disposed between the first substrate and the second substrate, wherein the conductive adhesive has an opening and the metal line is disposed in the opening of the conductive adhesive;
a viewing angle control medium disposed between the first substrate and the second substrate; and
a touch layer disposed between the viewing angle control medium and the first substrate, wherein the touch layer comprises:
a bridge electrode disposed on the first substrate;
first touch electrodes disposed on the first substrate; and
an insulation layer disposed between the bridge electrode and the first touch electrodes and having openings,
wherein the first touch electrodes are electrically connected to the bridging electrode through the openings of the insulation layer.

* * * * *